US010999463B2

(12) United States Patent
Tsuji et al.

(10) Patent No.: US 10,999,463 B2
(45) Date of Patent: May 4, 2021

(54) IMAGE FORMING APPARATUS EXECUTING PROCESSING FOR WAKE-UP FROM POWER SAVING STATE ACCORDING TO DIRECTION OF EYE GAZE DETECTED BY EYE-GAZE SENSOR

(71) Applicant: KYOCERA Document Solutions Inc., Osaka (JP)

(72) Inventors: Shuntaro Tsuji, Osaka (JP); Akihiko Ikazaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 17 days.

(21) Appl. No.: 16/420,706

(22) Filed: May 23, 2019

(65) Prior Publication Data

US 2019/0373127 A1 Dec. 5, 2019

(30) Foreign Application Priority Data

May 30, 2018 (JP) .............................. JP2018-103927

(51) Int. Cl.
*H04N 1/00* (2006.01)
*G06F 3/12* (2006.01)
*G06K 9/00* (2006.01)

(52) U.S. Cl.
CPC ....... *H04N 1/00896* (2013.01); *G06F 3/1204* (2013.01); *G06F 3/1221* (2013.01); *G06K 9/00369* (2013.01); *G06K 9/00604* (2013.01)

(58) Field of Classification Search
None
See application file for complete search history.

(56) References Cited

U.S. PATENT DOCUMENTS

2013/0010335 A1* 1/2013 Baba .................. H04N 1/00891
358/3.01
2014/0126018 A1* 5/2014 Sugimoto ............. G06F 3/1204
358/1.15

(Continued)

FOREIGN PATENT DOCUMENTS

EP     2728846 A1   5/2014
EP     3223197 A1   9/2017

(Continued)

OTHER PUBLICATIONS

Extended European Search Report dated Oct. 11, 2019 mailed in the corresponding European Patent Application No. 19176521.3.

*Primary Examiner* — Mohammad H Ghayour
*Assistant Examiner* — Pawan Dhingra
(74) *Attorney, Agent, or Firm* — IP Business Solutions, LLC

(57) ABSTRACT

An image forming apparatus includes an image forming section, a first detecting section, a second detecting section, a display section, and a control section. The first detecting section detects a person present within a predetermined range from the image forming apparatus. The second detecting section detects an eye gaze of the person detected by the first detecting section. When, during a power saving state of the image forming apparatus, the first detecting section detects a person and the second detecting section detects an eye gaze of the person directed in a predetermined direction, the control section wakes up the image forming apparatus from the power saving state and allows the display section to display a predetermined screen according to the direction of the person's eye gaze detected by the second detecting section.

3 Claims, 11 Drawing Sheets

(56) References Cited

U.S. PATENT DOCUMENTS

2015/0237227 A1\* 8/2015 Saisho ............... G06K 15/4095
348/77
2017/0279995 A1\* 9/2017 Yamasaki ............ G06K 15/406

FOREIGN PATENT DOCUMENTS

| JP | 2012-137525 A | 7/2012 |
| JP | 2015-002382 A | 1/2015 |

\* cited by examiner

☐ READY TO COPY NUMBER OF COPIES 1

IMAGE TO BE SENT

○ × △
———
———
———

ORIGINAL TYPE : A4
MAGNIFICATION : 100%
PAPER TYPE : A4

PREVIEW

K11
AUTO
△ SELECT PAPER TYPE

TWO- TO TWO-SIDED
△ TWO-SIDED/ SEPARATE

K12
100%
△ ENLARGE/ REDUCE

2 IN 1
△ AGGREGATE

K13
NORMAL
△ DARKNESS

AUTO
△ ORIGINAL SIZE

SHORTCUT1

SHORTCUT2

SHORTCUT3

SHORTCUT4

Fig.10

| STATUS CHECK | | | | |
|---|---|---|---|---|
| NO. | USER NAME | JOB TYPE | TERMINATION TIME | STATUS |
| 001 | USER 1 | COPY | 2000/01/01/10:10 | PRINTING |
| 002 | USER 2 | PRINT | 2000/01/01/10:05 | PRINTED |
| 003 | USER 3 | PRINT | 2000/01/01/10:03 | INTERRUPTED |
| 004 | USER 4 | COPY | 2000/01/01/9:52 | PRINTED |
| 005 | USER 5 | COPY | 2000/01/01/9:50 | PRINTED |
| 006 | USER 6 | PRINT | 2000/01/01/9:45 | PRINTED |
| 007 | USER 7 | COPY | 2000/01/01/9:30 | INTERRUPTED |
| 008 | USER 8 | PRINT | 2000/01/01/9:23 | PRINTED |
| 009 | USER 9 | COPY | 2000/01/01/9:10 | PRINTED |
| 010 | USER 10 | PRINT | 2000/01/01/9:00 | PRINTED |

☐ REDY TO SEND · NUMBER OF ADDRESSES 1

| ADDRESS | DETAILS |
|---|---|
| 001 OOOOO (K22) | 002 ***** (K22) | 003 AAAAA (K22) |
| 004 BBBB (K22) | 005 CCCCC (K22) | 006 DDDD (K22) |

K23 ADDRESS BOOK
K24 NEW MAIL
K25 NEW FOLDER

IMAGE TO BE SENT
ORIGINAL TYPE : A4
MAGNIFICATION :100%
PAPER TYPE : A4

PREVIEW — K21

IMAGE FORMING APPARATUS EXECUTING PROCESSING FOR WAKE-UP FROM POWER SAVING STATE ACCORDING TO DIRECTION OF EYE GAZE DETECTED BY EYE-GAZE SENSOR

INCORPORATION BY REFERENCE

This application claims priority to Japanese Patent Application No. 2018-103927 filed on May 30, 2018, the entire contents of which are incorporated by reference herein.

BACKGROUND

The present disclosure relates to an image forming apparatus executing processing for wake-up from a power saving state and a computer-readable non-transitory recording medium with an apparatus state transition program stored thereon.

There are known image forming apparatuses equipped with a motion sensor, an eye-gaze sensor, a camera, and so on.

An example of the above image forming apparatuses is one that determines the orientation of the feet of a person in front of the image forming apparatus from an image of the person's feet captured by a foot camera and determines whether or not the person is coming to the apparatus based on the determined orientation of the feet. Furthermore, there is an image forming apparatus in which such a determination result using a foot camera as described above is combined with detection results of a pyroelectric motion sensor and a reflective motion sensor to more accurately determine whether or not a person present near the image forming apparatus is a user of the image forming apparatus.

Another example of the above image forming apparatuses is one that determines whether or not a target location lies in the direction of a user's eye gaze detected by an eye-gaze detection camera and changes operational contents to be displayed according to the determination result to show the user suitable procedures for eliminating a paper jam.

SUMMARY

A technique improved over the aforementioned techniques is proposed as one aspect of the present disclosure.

An image forming apparatus according to an aspect of the present disclosure is an image forming apparatus capable of, upon satisfaction of a predetermined condition, waking up from a power saving state requiring less power and includes an image forming section, a first detecting section, a second detecting section, a display section, and a control unit. The image forming section forms an image on a recording paper sheet. The first detecting section detects a person present within a predetermined range from the image forming apparatus. The second detecting section detects an eye gaze of the person detected by the first detecting section. The control unit includes a processor and, upon execution of a control program by the processor, functions as a control section. When, during the power saving state of the image forming apparatus, the first detecting section detects a person and the second detecting section detects an eye gaze of the person directed in a predetermined direction, the control section wakes up the image forming apparatus from the power saving state and allows the display section to display a predetermined screen according to the direction of the person's eye gaze detected by the second detecting section.

In a computer-readable non-transitory recording medium with an apparatus state transition program stored thereon according to another aspect of the present disclosure, the apparatus state transition program allows a computer including a processor to function as a control section upon execution of the apparatus state transition program by the processor. When a predetermined condition is satisfied, the control section allows an image forming apparatus including an image forming section capable of forming an image on a recording paper sheet and a display section to wake up from a power saving state requiring less power. When, during the power saving state of the image forming apparatus, a first detecting section capable of detecting a person present within a predetermined range from the image forming apparatus detects a person and a second detecting section capable of detecting an eye gaze of the person detected by the first detecting section detects an eye gaze of the person directed in a predetermined direction, the control section wakes up the image forming apparatus from the power saving state and allows the display section to display a predetermined screen according to the direction of the person's eye gaze detected by the second detecting section.

BRIEF DESCRIPTION OF THE DRAWINGS

FIG. 8 is a view showing an example of a copy screen.
FIG. 10 is a view showing an example of a job history screen.
FIG. 11 is a view showing an example of a send screen.

DETAILED DESCRIPTION

Hereinafter, a description will be given of an image forming apparatus 1 according to an embodiment of the present disclosure with reference to the drawings. The image forming apparatus 1 is a multifunction peripheral having multiple functions, including a facsimile function, a copy function, a print function, and a scan function.

Figure 1:
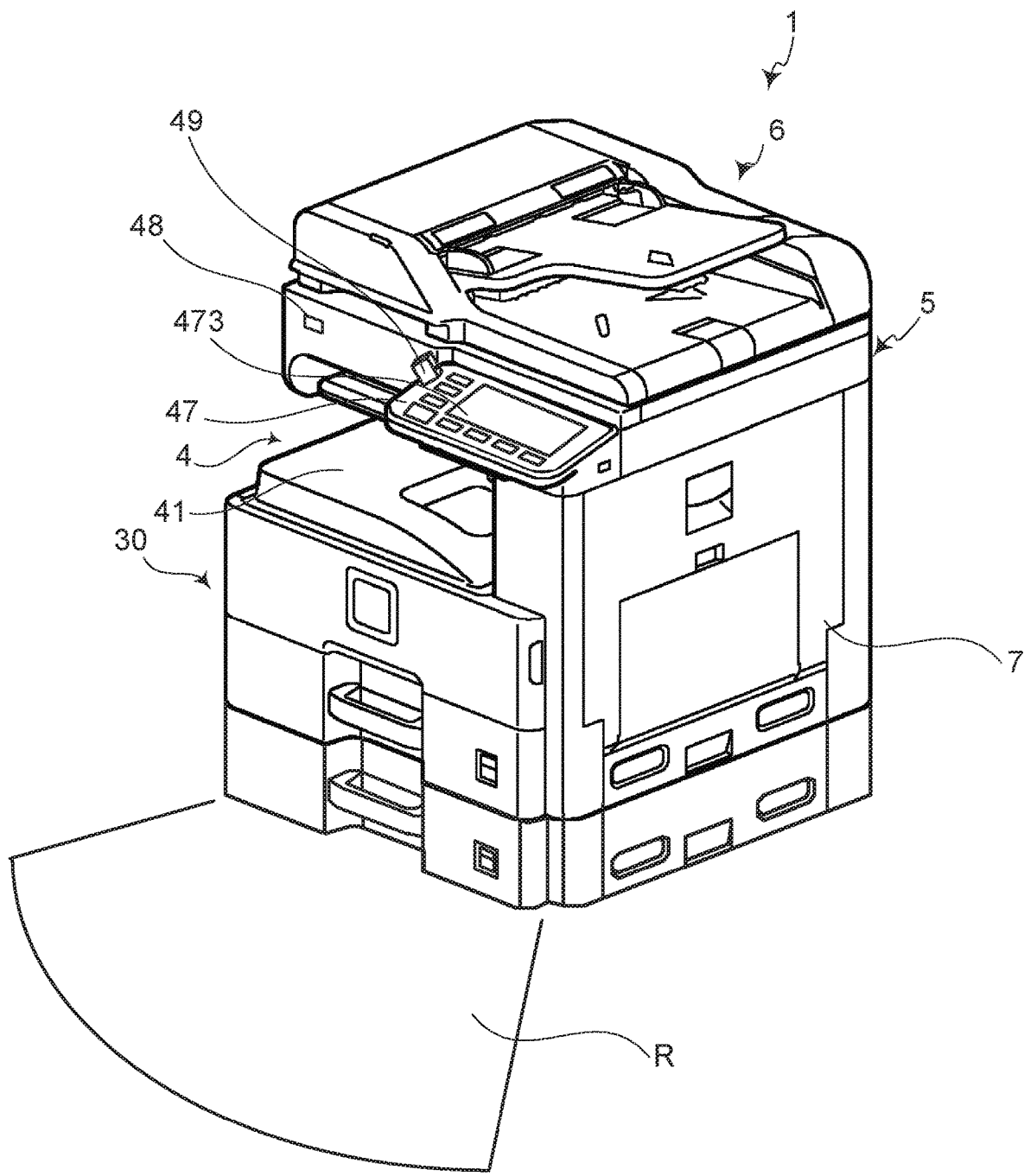
FIG. 1 is a perspective view showing an appearance of an image forming apparatus according to an embodiment of the present disclosure.

FIG. 1 is a perspective view showing an appearance of the image forming apparatus 1. Referring to FIG. 1, a housing 7 of the image forming apparatus 1 contains a plurality of devices for implementing various functions of the image forming apparatus 1. For example, the housing 7 contains an image reading section 5, an image forming section 12 (not shown in FIG. 1), a fixing section 13 (not shown in FIG. 1), a sheet feed section 30, and so on.

The image reading section 5 is an ADF (auto document feeder) including: a document feed section 6 that feeds an original document; and a scanner that optically reads the original document being fed by the document feed section 6 or an original document placed on an unshown original glass plate. The image reading section 5 irradiates an original document with light from a lighting part and receives light reflected from the original document on a CCD sensor to read an image from the original document and acquire image data.

The image forming section 12 includes a photosensitive drum, a charging device, an exposure device, a developing device, and a transfer device. The image forming section 12 forms a toner image on a recording paper sheet fed from a sheet feed section 30, based on the image data acquired by the image reading section 5 or image data sent from a personal computer or another facsimile device connected thereto via a network.

The fixing section 13 performs fixation processing for heating a recording paper sheet having a toner image formed on its surface by the image formation processing of the image forming section 12 and fixing the toner image on the recording paper sheet by application of heat and pressure. After being subjected to the fixation processing of the fixing section 13, the recording paper sheet having an image formed and fixed thereon is discharged to a sheet output section 4.

The sheet output section 4 includes: an output tray 41 on which discharged recording paper sheets each having an image formed and fixed thereon are to be placed; and a third detecting section 50 (not shown in FIG. 1) that detects whether or not any recording paper sheet is present on the output tray 41. No particular limitation is placed on the type of the third detecting section 50 so long as it is commonly used. An example that can be used is a reflective optical sensor that includes: a lighting part capable of irradiating a recording paper sheet with light; and a light-receiving part capable of receiving reflected light from the recording paper sheet, and detects whether any recording paper sheet is present or absent based on the magnitude of the amount of received light detected by the light-receiving part.

The sheet feed section 30 pulls out recording paper sheets contained in a sheet cassette or recording paper sheets put on a manual feed tray sheet by sheet and feeds forward the pulled-out recording paper sheet to the image forming section 12.

The image forming apparatus 1 includes an operating section 47 located near the image reading section 5 and on the front side of the image forming apparatus 1. The operating section 47 accepts user's instructions for processing on various functions executable by the image forming apparatus 1, the instructions being input by the user through the operating section 47. The operating section 47 includes a touch panel-equipped display section 473. The display section 473 displays various screens, including a home screen, a copy screen, a send screen, and a job history screen.

A first detecting section 48 capable of detecting a person present near the image forming apparatus 1 is provided on the front side of the image forming apparatus 1. The first detecting section 48 is a motion sensor. No particular limitation is placed on the type of the motion sensor so long as it is commonly used. An example that can be used is an infrared sensor. In this embodiment, the first detecting section 48 detects a person present within an area R which is a detectable range of the first detecting section 48.

The operating section 47 is provided with a second detecting section 49 that detects an eye gaze of the person detected by the first detecting section 48. The second detecting section 49 is an eye-gaze sensor. No particular limitation is placed on the type of the eye-gaze sensor so long as it is commonly used. An example that can be used is a contactless eye-gaze sensor using a corneal reflection technique. In this embodiment, the second detecting section 49 includes: a light source 49A that irradiates a user's eye, specifically, a cornea, with near-infrared rays; and a camera 49B that captures the movement of the eye on which corneal reflection is generated. The second detecting section 49 outputs image data captured by the camera 49B to a control section 10 to be described hereinafter. Since the operating section 47 is provided with the second detecting section 49 as just described, the burden on the user wearing a head-mounted display as an eye-gaze sensor can be eliminated, so that the user's working efficiency can be increased.

Figure 2:
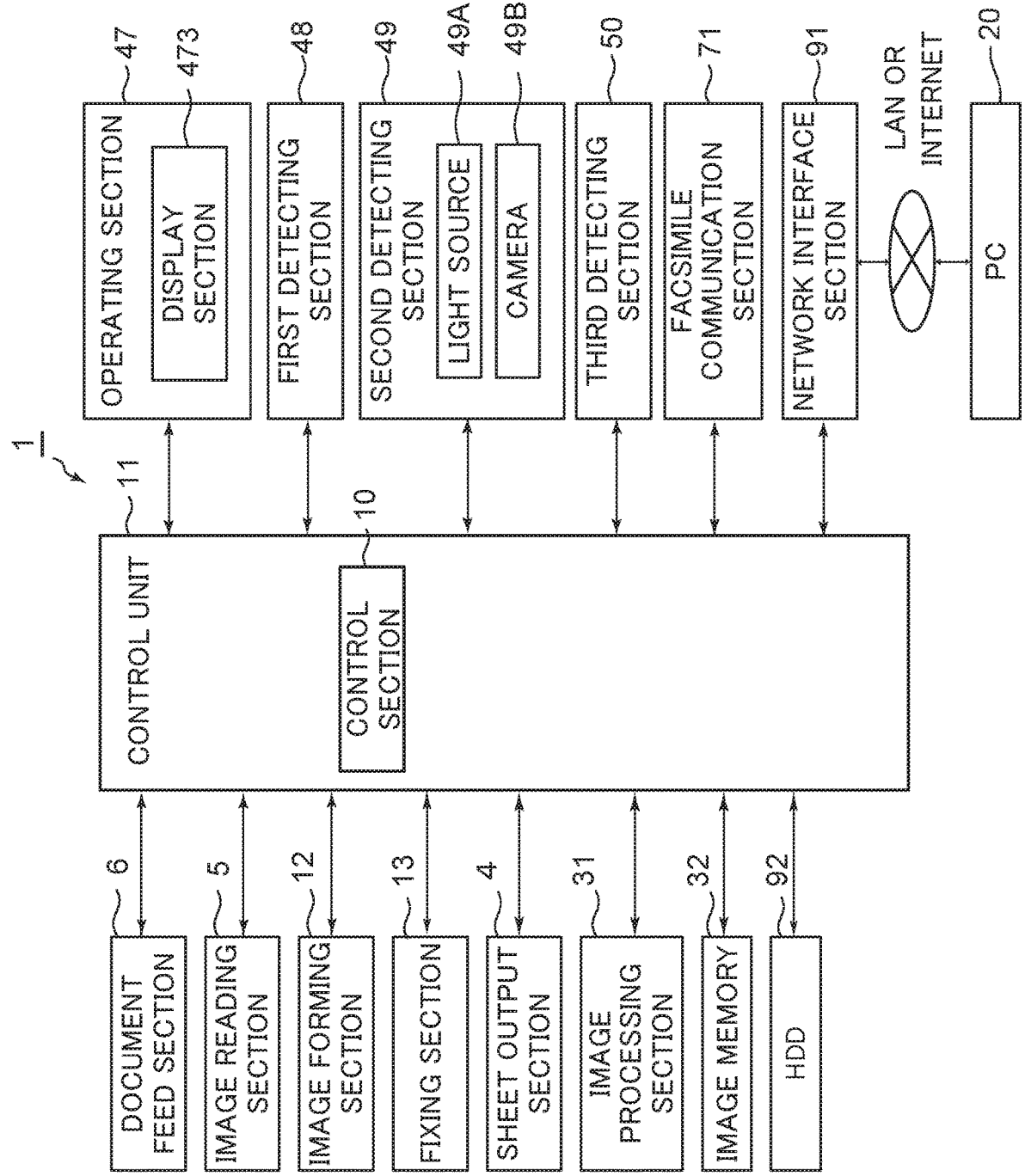
FIG. 2 is a block diagram showing an internal configuration of the image forming apparatus according to the embodiment of the present disclosure.

FIG. 2 is a block diagram showing an internal configuration of the image forming apparatus 1. Referring to FIG. 2, the image forming apparatus 1 includes a control unit 11. The control unit 11 includes a processor, a RAM (random access memory), a ROM (read only memory), and so on. The processor is, for example, a CPU (central processing unit), an MPU (micro-processing unit) or an ASIC (application specific integrated circuit). When a control program (an apparatus state transition program) stored in the above ROM or an HDD 92 is executed by the processor, the control unit 11 functions as a control section 10. Alternatively, each functional section of the control unit 11 may not be implemented by the operation of the processor in accordance with the above control program, but may be constituted by a hardware circuit.

The control section 10 is electrically connected to the document feed section 6, the image reading section 5, the image forming section 12, the fixing section 13, the sheet output section 4, the operating section 47, the first detecting section 48, the second detecting section 49, the third detecting section 50, an image processing section 31, an image memory 32, an HDD 92, a facsimile communication section 71, a network interface section 91, and so on. The control section 10 governs the overall control of the image forming apparatus 1. More specifically, the control section 10 executes various computer programs to perform various types of processing, including the operations of the sections of the image forming apparatus 1 and communications with information processing apparatuses, such as a personal computer 20, connected via a LAN (local area network) or other networks.

The image processing section 31 performs, as necessary, image processing of image data acquired by the image reading section 5.

The image memory 32 includes a region for temporarily storing image data acquired by the image reading section 5. For example, the image memory 32 temporarily stores image data to be subjected to image formation by the image forming section 12.

The HDD (hard disk drive) 92 is a large storage device capable of storing various types of data, including image data read by the image reading section 5. The HDD 92 also stores various computer programs for implementing the operations of the image forming apparatus 1. In this embodiment, the HDD 92 stores an apparatus state transition program for use in executing processing for wake-up from a power save mode to be described hereinafter. Alternatively, the processing for wake-up from the power save mode to be described below may not be implemented by the operation of the processor in accordance with the apparatus state transition program, but may be operable by a hardware circuit.

The facsimile communication section 71 performs connection to a public line and transfers image data to and from other facsimile devices via the public line.

The network interface section 91 interfaces the image forming apparatus 1 to the LAN or other networks. The image forming apparatus 1 performs data communications through the network interface section 91 with information processing apparatuses, such as the personal computer 20, on the LAN or other networks.

Each of the above sections of the image forming apparatus 1 is connected to an unshown power supply and operates on electric power supplied from the power supply. In this embodiment, the control section 10 controls power supply to each of the sections of the image forming apparatus 1. When a predetermined condition, such as the absence of image formation processing for a predetermined period, is satisfied, the control section 10 stops or limits power supply to each section of the image forming apparatus 1 to switch the state of the image forming apparatus 1 to a power saving state (hereinafter, referred to as a "power save mode") requiring less power. Furthermore, when another predetermined condition, such as the application of any operation to the operating section 47, is satisfied, the control section 10 performs processing for wake-up from the power save mode to switch the state of the image forming apparatus 1 to a state where processing on various functions of the image forming apparatus 1 can be immediately executed.

Figure 3:
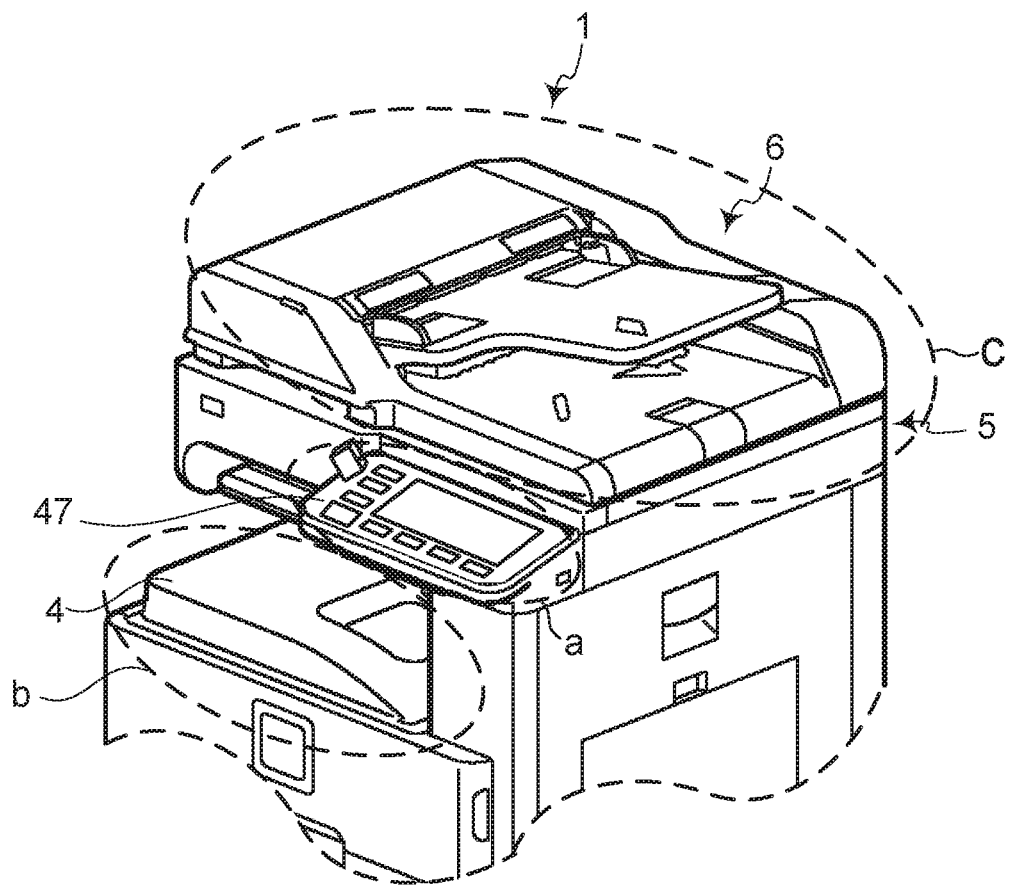
FIG. 3 is a perspective view showing an appearance of an upper portion of the image forming apparatus according to the embodiment of the present disclosure.

FIG. 3 is a perspective view showing an appearance of an upper portion of the image forming apparatus 1. Referring to FIG. 3, in the below-described processing for wake-up from the power save mode according to this embodiment, the control section 10 makes analysis based on image data output from the second detecting section 49 to calculate a gazing point of the user and determines on which of a region a, a region b, and a region c the calculated gazing point has been concentrated. Note that the region a, the region b, and the region c are different regions. The region a is a region containing the operating section 47. The region b is a region containing the sheet output section 4. The region c is a region containing the image reading section 5 including the document feed section 6. For example, when the user's eye gaze is directed toward the operating section 47, the control section 10 determines that the gazing point has been concentrated on the region a.

[Operations]

Figure 4:
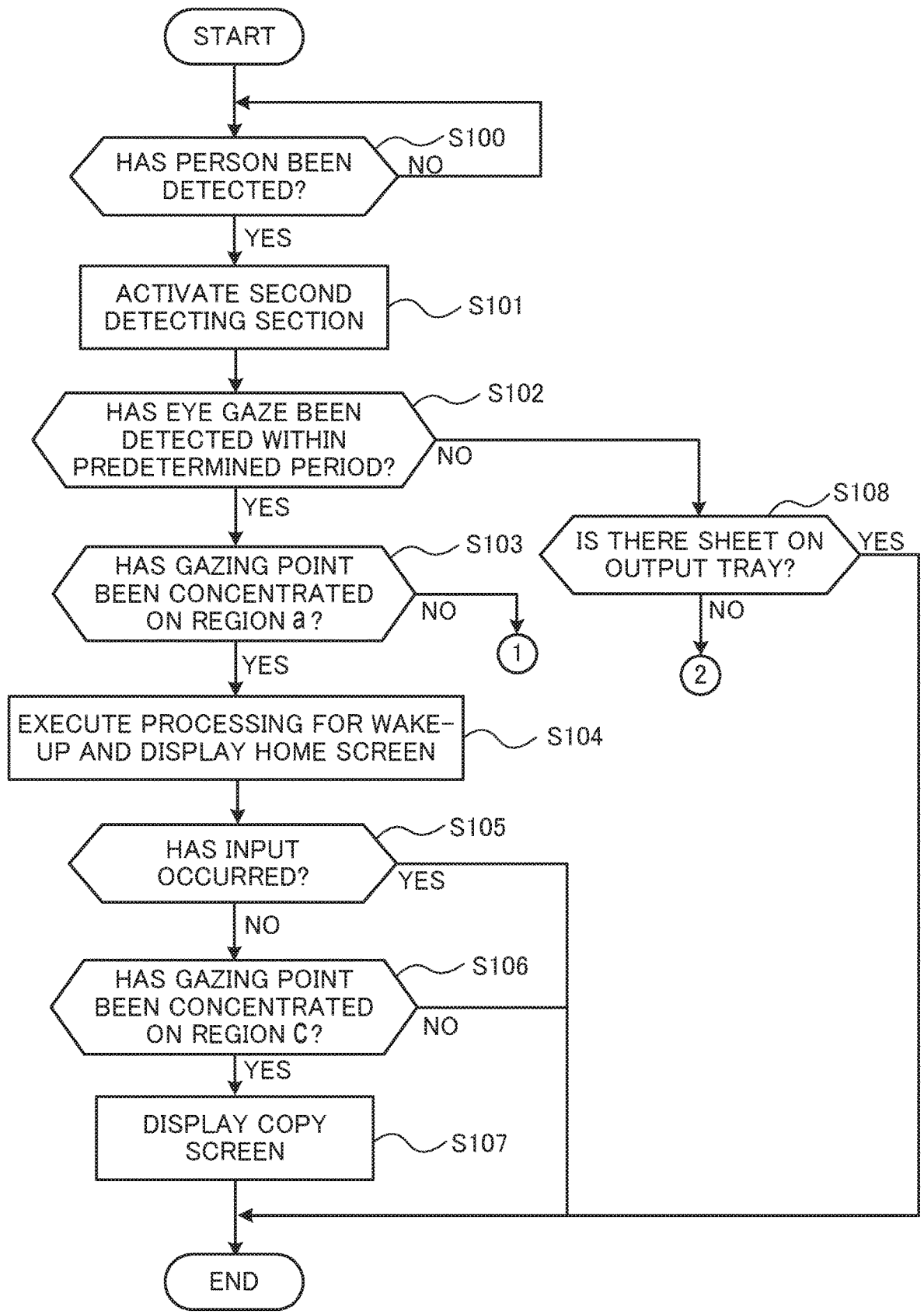
FIG. 4 is a part of a flowchart showing processing for wake-up from a power save mode in the embodiment of the present disclosure.
Figure 5:
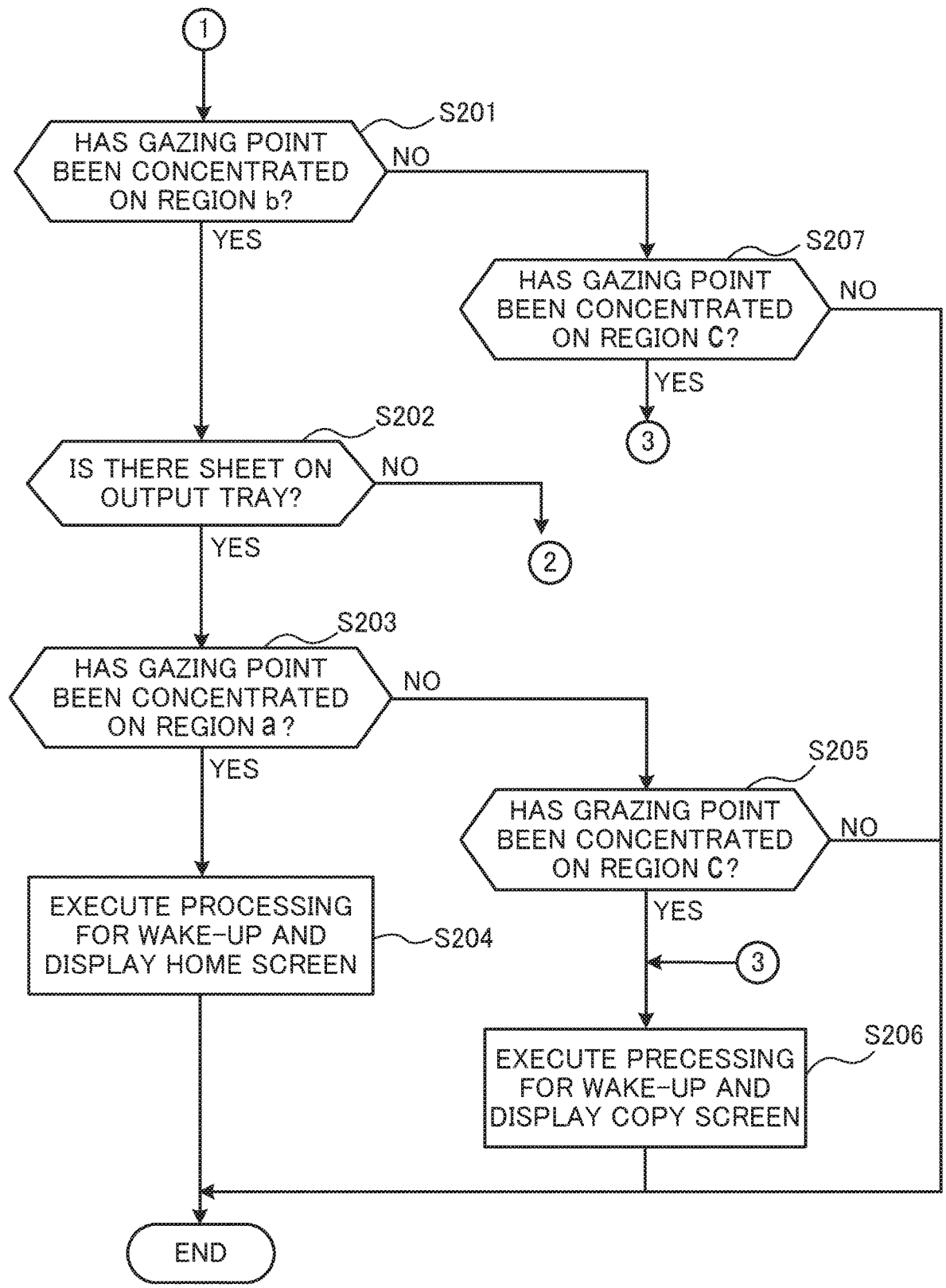
FIG. 5 is another part of the flowchart showing processing for wake-up from the power save mode in the embodiment of the present disclosure.
Figure 6:
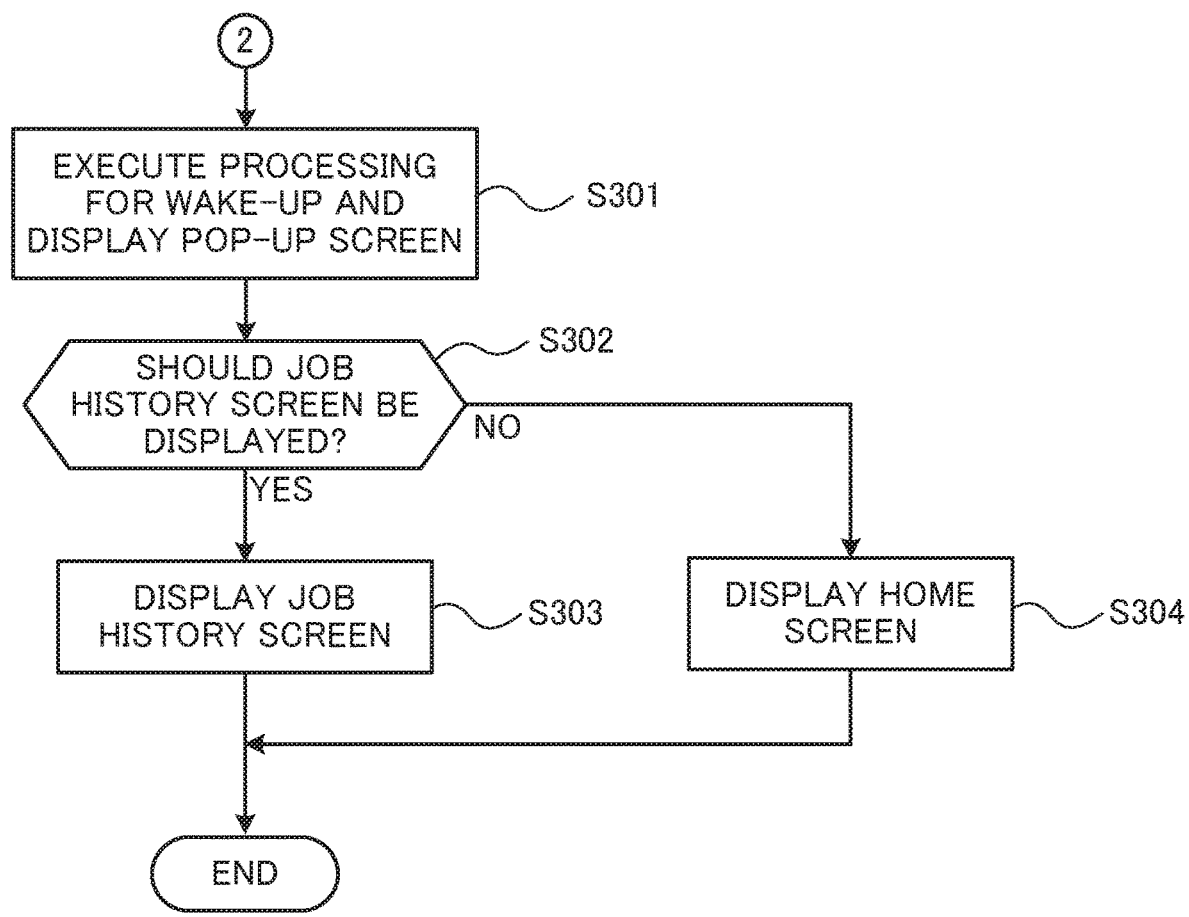
FIG. 6 is still another part of the flowchart showing processing for wake-up from the power save mode in the embodiment of the present disclosure.

A description will be given below of the control structure of the apparatus state transition program to be executed on the image forming apparatus 1 in order to execute processing for wake-up from the power save mode according to this embodiment, together with an operation of the image forming apparatus 1. FIGS. 4 to 6 shows a flowchart of the processing for wake-up from the power save mode. The apparatus state transition program according to this embodiment is run upon transition of the image forming apparatus 1 to the power save mode.

The image forming apparatus 1 is in a state where image formation processing is not performed for a predetermined period after power-on and the image forming apparatus 1 has transitioned to the power save mode. In the power save mode, the control section 10 supplies power to the first detecting section 48 to monitor any person approaching the image forming apparatus 1.

Referring to FIG. 4, when a user approaches the front of the image forming apparatus 1 and enters the area R, the first detecting section 48 detects the person present in the area R. The control section 10 determines that a person present in the area R has been detected by the first detecting section 48 (YES in step S100), and supplies power to the second detecting section 49 to activate the second detecting section 49 (step S101). When the second detecting section 49 detects an eye gaze within one second after the activation of the second detecting section 49, the control section 10 determines that the second detecting section 49 has detected an eye gaze within a predetermined period (one second in this case) after the activation of the second detecting section 49 (YES in step S102), calculates a gazing point of the user based on image data output from the second detecting section 49, and determines whether or not the calculated gazing point has been concentrated on the region a (step S103).

(1) When User's Eye Gaze is Directed First Toward Operating Section 47

When the user's eye gaze is directed first toward the operating section 47, the control section 10 determines that the calculated gazing point has been concentrated on the region a (YES in step S103), executes the processing for wake-up from the power save mode, and allows the display section 473 to display a home screen (step S104).

Figure 7:
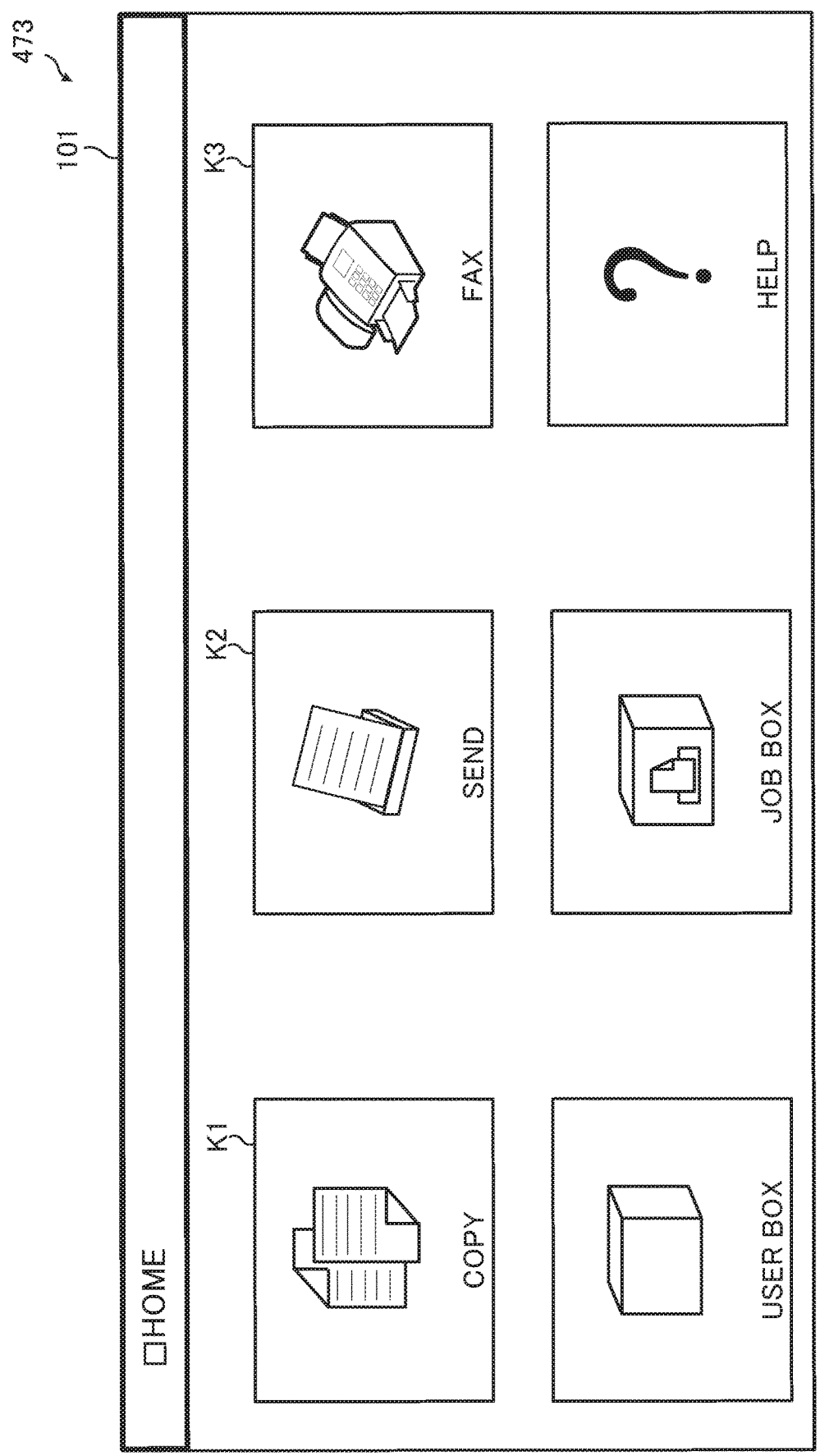
FIG. 7 is a view showing an example of a home screen.

FIG. 7 is a view showing an example of the home screen 101. Referring to FIG. 7, the home screen 101 is a screen for use in selecting one of a plurality of functions executable by the image forming apparatus 1. The home screen 101 includes a plurality of soft keys through one of which the selection of a function desired by the user is to be input. For example, the home screen 101 includes as the soft keys a key K1 for selecting a copy function, a key K2 for selecting a scan function, a key K3 for selecting a facsimile function, and so on. When the user presses one of the plurality of soft keys described above, the control section 10 determines that an input from the operating section 47 has occurred (YES in step S105). Then, the control section 10 allows the display section 473 to display a screen through which various settings for the function associated with the pressed key are to be made.

(1-1) When User's Eye Gaze is Directed First Toward Operating Section 47 and then Toward Image Reading Section 5

When the user does not perform any operation of the operating section 47 with the home screen 101 displayed and the user's eye gaze is directed toward the document feed section 6 provided in the image reading section 5 within one second after being directed toward the operating section 47, the control section 10 determines that no input from the operating section 47 has occurred (NO in step S105), also determines that the gazing point has been concentrated on the region c within one second after having been concentrated on the region a (YES in step S106), and allows the display section 473 to display a copy screen (step S107).

FIG. 8 is a view showing an example of the copy screen 102. Referring to FIG. 8, the copy screen 102 is a screen for use in making various settings for the copy function. The copy screen 102 includes a plurality of soft keys through which various settings on processing of the image reading section 5 for reading an image of an original document (processing for executing the copy function in this case) are to be input. For example, the copy screen 102 includes as the soft keys a key K11 for selecting one of sheet feed cassettes, a key K12 for setting the magnification of an original document, a key K13 for setting the printing darkness, and so on. When the user presses one of the plurality of soft keys described above, the control section 10 allows the display section 473 to display a screen or window through which a setting associated with the selected key is to be made.

(1-2) When User's Eye Gaze Directed First Toward Operating Section 47 is Kept Unchanged When the user does not perform any operation of the operating section 47 with the home screen 101 displayed and the user's eye gaze directed toward the operating section 47 is kept unchanged, the control section 10 determines that the gazing point has not been concentrated on the region c within one second after having been concentrated on the region a (NO in step S106), and waits until an input from the operating section 47 occurs.

(2) When User's Eye Gaze is Directed First Toward Sheet Output Section 4

Referring to FIG. 5, when the user's eye gaze is directed first toward the sheet output section 4, the control section 10 determines that the gazing point has not been concentrated on the region a (NO in step S103) and determines that the gazing point has been concentrated on the region b (YES in step S201).

(2-1) When Recording Paper Sheet is Present on Sheet Output Section 4

In this case, one or a plurality of recording paper sheets having images formed thereon are discharged onto the sheet output tray of the sheet output section 4 and the user is there to pick up the discharged recording paper sheet or sheets. The recording paper sheet or sheets having images formed thereon are present on the sheet output tray of the sheet output section 4. The control section 10 determines that the presence of a recording paper sheet or sheets on the sheet output section 4 has been detected by the third detecting section 50 (YES in step S202).

(2-1-1) When User's Eye Gaze is Directed First Toward Sheet Output Section 4 and Then Toward Operating Section 47

When the user further desires to use another function of the image forming apparatus 1 and the user's eye gaze is directed toward the operating section 47 within one second after being directed toward the sheet output section 4, the control section 10 determines that the gazing point has been concentrated on the region a within one second after having been concentrated on the region b (YES in step S203), executes the processing for wake-up from the power save mode, and allows the display section 473 to display the home screen 101 (step S204).

(2-1-2) when User's Eye Gaze is Directed First Toward Sheet Output Section 4 and then Toward Image Reading Section 5

When the user further desires to use the copy function and the user's eye gaze is directed toward the document feed section 6 provided in the image reading section 5 within one second after being directed toward the sheet output section 4, the control section 10 determines that the gazing point has not been concentrated on the region a within one second after having been concentrated on the region b (NO in step S203), determines that the gazing point has been concentrated on the region c within one second after having been concentrated on the region b (YES in step S205), executes the processing for wake-up from the power save mode, and allows the display section 473 to display the copy screen 102 (step S206).

(2-1-3) when User's Eye Gaze Directed First Toward Sheet Output Section 4 is Kept Unchanged When the user is there simply to pick up one or a plurality of recording paper sheets having images formed thereon and discharged to the sheet output section 4 and the user's eye gaze directed toward the sheet output section 4 is kept unchanged, the control section 10 determines that the gazing point has not been concentrated on the region c within one second after having been concentrated on the region b (NO in step S205), does not execute the processing for wake-up from the power save mode, and keeps the state of the image forming apparatus 1 in the power save mode.

(2-2) When No Recording Paper Sheet is Present on Sheet Output Section 4

In this case, the user is there to pick up one or a plurality of recording paper sheet discharged onto the sheet output tray of the sheet output section 4, but no recording paper sheet having an image formed thereon is present on the sheet output tray. Referring to FIG. 6, no recording paper sheet having an image formed thereon is present on the sheet output tray of the sheet output section 4. The control section 10 determines that the absence of any recording paper sheet on the sheet output section 4 has been detected by the third detecting section 50 (NO in step S202), executes the processing for wake-up from the power save mode, and allows the display section 473 to display a pop-up screen for use in selecting whether or not to display a job history screen (step S301).

Figure 9:
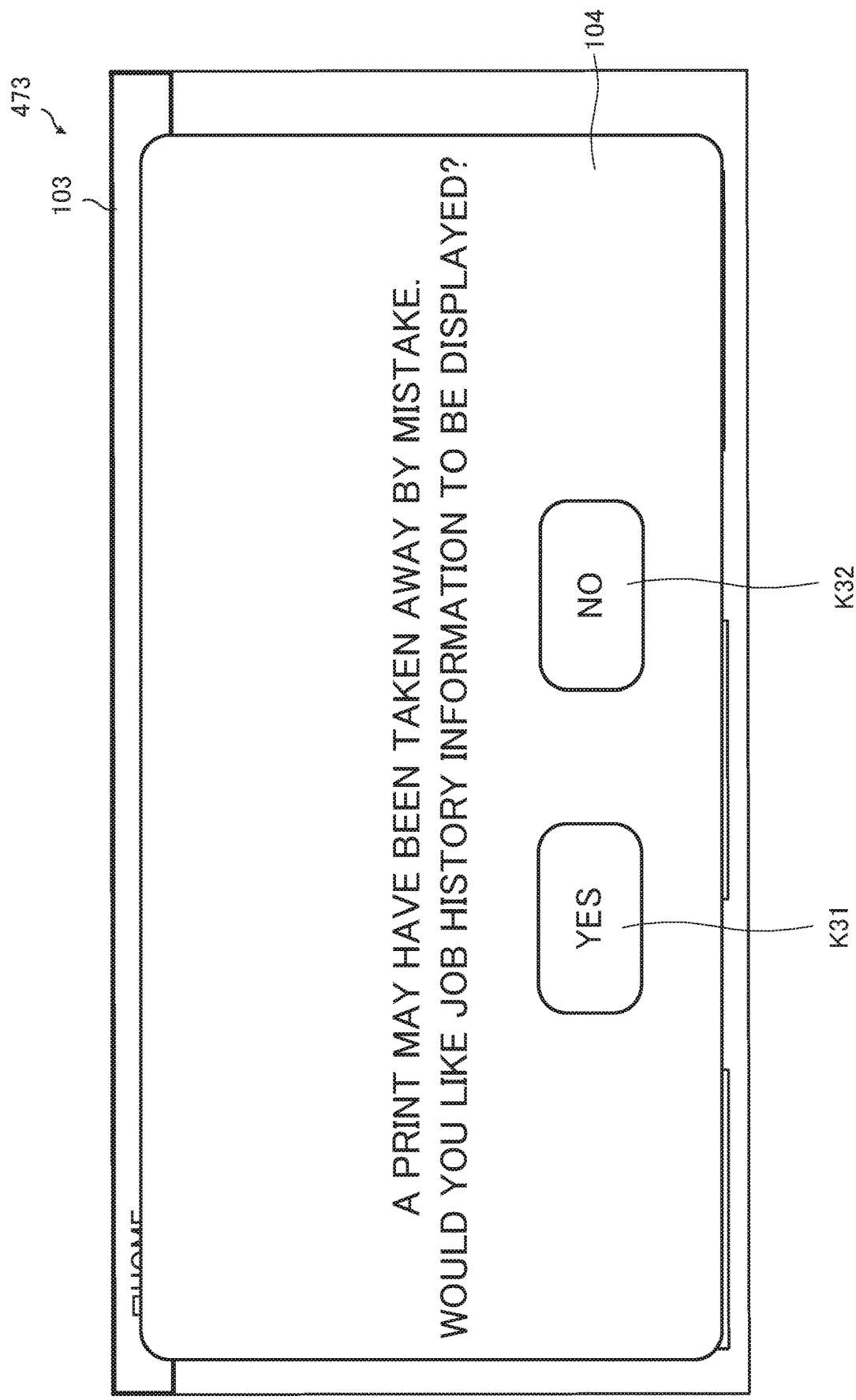
FIG. 9 is a view showing an example of a pop-up screen.

FIG. 9 is a view showing an example of the pop-up screen 103. Referring to FIG. 9, the pop-up screen 103 is a screen for use in selecting whether or not to display a job history screen. The pop-up screen 103 includes: a message asking the user whether or not to display a job history screen; and a plurality of soft keys through which the selection of acceptance or refusal to display a job history screen is to be input. For example, the pop-up screen 103 includes a pop-up window 104 containing a message "A PRINT MAY HAVE BEEN TAKEN AWAY BY MISTAKE. WOULD YOU LIKE JOB HISTORY INFORMATION TO BE DISPLAYED?". The pop-up screen 103 further includes as the soft keys a key K31 for instructing to display a job history screen and a key K32 for instructing not to display a job history screen.

When the user having confirmed the pop-up screen 103 desires the display of a job history screen and presses the key K31, the control section 10 determines that the display of a job history screen has been selected (YES in step S302) and allows the display section 473 to display a job history screen (step S303).

FIG. 10 is a view showing an example of the job history screen 105. Referring to FIG. 10, the job history screen 105 is a screen for use in checking the statuses of executed jobs. On the job history screen 105, a list of pieces of history information on jobs executed for a predetermined period (one day in this embodiment) is displayed so that the pieces of history information can be shifted ten by ten from the latest to the earliest. Each piece of history information contains a "User Name" for use in identifying the executant of a job, a "Job Type" indicating the type of the job executed, such as copy processing or print processing, a "Termination Time" indicating the time of termination of the job, and a "Status" indicating the status of progress of the job, such as a status where the job is completed or a status where the job is interrupted.

On the other hand, when the user having confirmed the pop-up screen 103 does not desire the display of a job history screen and presses the key K32, the control section 10 determines that non-display of a job history screen has been selected (NO in step S302) and allows the display section 473 to display the home screen 101 (step S304).

(3) When User's Eye Gaze is Directed First Toward Image Reading Section 5

When the user's eye gaze is directed first toward the document feed section 6 provided in the image reading section 5, the control section 10 determines that the gazing point has not been concentrated on the region b (NO in step S201), determines that the gazing point has been concentrated on the region c (YES in step S207), executes the processing for wake-up from the power save mode, and allows the display section 473 to display the copy screen 102 (step S206).

(4) When No User's Eye Gaze is Detected

When a person approaching the front of the image forming apparatus 1 has been detected by the first detecting section 48 but no eye gaze is detected by the second detecting section 49 within one second after the activation of the second detecting section 49, the control section 10 determines that no eye gaze has been detected by the second detecting section 49 (NO in step S102).

(4-1) When No Recording Paper Sheet is Present on Sheet Output Section 4

When no recording paper sheet having an image formed thereon is present on the sheet output tray of the sheet output section 4, the control section 10 determines that the absence of any recording paper sheet on the sheet output section 4 has been detected by the third detecting section 50 (NO in step S108), executes the processing for wake-up from the power save mode, and allows the display section 473 to display the pop-up screen 103 (step S301).

When the user desires the display of a job history screen and presses the key K31, the control section 10 determines that the display of a job history screen has been selected (YES in step S302) and allows the display section 473 to display the job history screen 105 (step S303).

On the other hand, when the user does not desire the display of a job history screen and presses the key K32, the control section 10 determines that non-display of a job history screen has been selected (NO in step S302) and allows the display section 473 to display the home screen 101 (step S304).

(4-2) When Recording Paper Sheet is Present on Sheet Output Section 4

When a recording paper sheet or sheets having images formed thereon are present on the sheet output tray of the sheet output section 4, the control section 10 determines that the presence of a recording paper sheet or sheets on the sheet output section 4 has been detected by the third detecting section 50 (YES in step S108), does not execute the processing for wake-up from the power save mode, and keeps the state of the image forming apparatus 1 in the power save mode.

(5) When User's Eye Gaze is Roving

For example, when the user does not intend to use the image forming apparatus 1 and the user's eye gaze is roving, the control section 10 determines that the gazing point has not been concentrated on the region c (NO in step S207), does not execute the processing for wake-up from the power save mode, and keeps the state of the image forming apparatus 1 in the power save mode. Thus, the image forming apparatus 1 can be prevented from being waken up in vain from a power saving state.

According to this embodiment, the image forming apparatus 1 is an apparatus capable of, upon satisfaction of a predetermined condition, waking up from a power saving state requiring less power and includes: the image forming section 12 that forms an image on a recording paper sheet; the first detecting section 48 that detects a person present within a predetermined range from the image forming apparatus 1; the second detecting section 49 that detects an eye gaze of the person detected by the first detecting section 48; the display section 473, and the control section 10. When, during the power saving state of the image forming apparatus 1, a person is detected by the first detecting section 48 and an eye gaze of the person directed in a predetermined direction is detected by the second detecting section 49, the control section 10 wakes up the image forming apparatus 1 from the power saving state and allows the display section 473 to display a predetermined screen according to the direction of the person's eye gaze detected by the second detecting section 49.

As just described, when a person is detected by the first detecting section 48 and an eye gaze of the person directed in a predetermined direction is detected by the second detecting section 49, i.e., when the use of the image forming apparatus 1 can be expected based on the direction of the detected eye gaze, the image forming apparatus 1 is waken up from the power saving state. Therefore, the image forming apparatus 1 can be prevented from being waken up in vain from the power saving state when the use of the image forming apparatus 1 is not expected, such as when a person does nothing more than pass in front of the image forming apparatus 1 or when a user is there simply to pick up a recording paper sheet or sheets having images formed thereon. Thus, as compared to the case where the image forming apparatus is waken up from the power saving state based only on the fact that a person has been detected by the first detecting section 48, power consumption can be reduced.

Furthermore, a predetermined screen according to the direction of the eye gaze detected by the second detecting section 49 is displayed, i.e., a screen related to a function expected to be used based on the direction of the detected eye gaze is displayed. Therefore, as compared to the case where the user calls a screen related to a desired function to be executed and allows the display section to display the screen, the user's work can be saved and the user's working efficiency can be further increased.

In the case of the image forming apparatus, as described in BACKGROUND above, having the function of waking up itself from a power saving state when a person is detected by a motion sensor, the image forming apparatus may be waken up in vain from the power saving state when the use of the image forming apparatus is not expected, such as when a person does nothing more than pass in front of the image forming apparatus or when a user is there simply to pick up a recording paper sheet or sheets having images formed thereon.

In the other image forming apparatus described in BACKGROUND above, a head-mounted display is used as an eye-gaze detection camera. The user must to wear the eye-gaze detection camera in using the image forming apparatus 1, which is a great burden on the user and decreases the working efficiency.

Unlike the above known techniques, in this embodiment, an image forming apparatus and an apparatus state transition program can be provided in which reduced power consumption and high working efficiency are offered by reducing false wake-up from the power saving state.

Furthermore, according to this embodiment, the image forming apparatus 1 further includes the operating section 47 that accepts an input instruction. When, during the power saving state of the image forming apparatus 1, a person is detected by the first detecting section 48 and an eye gaze of the person directed toward the operating section 47 is detected by the second detecting section 49, the control section 10 wakes up the image forming apparatus 1 from the power saving state and allows the display section 473 to display the home screen 101 for use in selecting one of the plurality of functions executable by the image forming apparatus 1.

Thus, the user can select a desired function without performing any operation for displaying the home screen 101, so that the user's working efficiency can be further increased.

Moreover, according to this embodiment, the image forming apparatus 1 further includes the image reading section 5 that reads an image of an original document. When, during the power saving state of the image forming apparatus 1, a person is detected by the first detecting section 48 and an eye gaze of the person directed toward the image reading section 5 is detected by the second detecting section 49, the control section 10 wakes up the image forming apparatus 1 from the power saving state and allows the display section 473 to display the copy screen 102 for use in making settings on processing of the image reading section 5 for reading an image of an original document.

Thus, the user desiring to use the copy function can use the copy function without performing any operation for displaying the copy screen 102, so that the user's working efficiency can be further increased.

Furthermore, according to this embodiment, the image forming apparatus 1 further includes the sheet output section 4 to which a recording paper sheet having an image formed thereon is to be discharged. When, during the power saving state of the image forming apparatus 1, a person is detected by the first detecting section 48 and an eye gaze of the person directed toward the sheet output section 4 is detected by the second detecting section 49, the control section 10 keeps the state of the image forming apparatus 1 in the power saving state.

Thus, the image forming apparatus 1 can be prevented from being waken up in vain from the power saving state when a user is highly likely to be there simply to pick up a recording paper sheet or sheets having images formed thereon. Therefore, as compared to the case where the image forming apparatus 1 is waken up from the power saving state based only on the fact that a person has been detected by the first detecting section 48, power consumption can be reduced.

Moreover, according to this embodiment, the image forming apparatus 1 further includes the third detecting section 50 that detects whether or not any recording paper sheet is present on the sheet output section 4. When, during the power saving state of the image forming apparatus 1, a person is detected by the first detecting section 48, an eye gaze of the person directed toward the sheet output section 4 is detected by the second detecting section 49, and the absence of any recording paper sheet on the sheet output section 4 is detected by the third detecting section 50, the control section 10 wakes up the image forming apparatus 1 from the power saving state and allows the display section 473 to display the job history screen 105 for use in checking the statuses of pieces of processing executed on the image forming apparatus 1.

When, as just described, no recording paper sheet is present on the sheet output section 4 even though a user is highly likely to be there to pick up a recording paper sheet or sheets having images formed thereon, another user is highly likely to have taken away the print or prints by mistake. Since in this case the job history screen 105 is displayed, the user can easily identify a job highly likely to have caused the print or prints to be taken away by mistake. Therefore, user convenience can be further increased.

According to this embodiment, when, during the power saving state of the image forming apparatus 1, a person is detected by the first detecting section 48, no eye gaze of the person is detected by the second detecting section 49, and the absence of any recording paper sheet on the sheet output section 4 is detected by the third detecting section 50, the control section 10 wakes up the image forming apparatus 1 from the power saving state and allows the display section 473 to display the job history screen 105 for use in checking the statuses of pieces of processing executed on the image forming apparatus 1.

When, as just described, a person present within the predetermined range from the image forming apparatus 1 is detected by the first detecting section 48, but no eye gaze of the person is detected by the second detecting section 49, the user may take a low position, such as crouch low, to peer into the sheet output section 4 and look for a print or prints. Since in this case the job history screen 105 is displayed, the user can easily identify a job highly likely to have caused the print or prints to be taken away by mistake. Therefore, user convenience can be further increased.

Although in the above embodiment the display section 473 is allowed to display the copy screen 102 when an eye gaze of a person directed toward the image reading section 5 is detected by the second detecting section 49, the screen to be displayed in such a case in the present disclosure is not limited to the copy screen. For example, the send screen 107 may be displayed.

FIG. 11 is a view showing an example of the send screen 107. Referring to FIG. 11, the send screen 107 is a screen for use in making various settings for the scan function. The send screen 107 includes a plurality of soft keys through which various settings on processing of the image reading section 5 for reading an image of an original document (processing for executing the scan function in this case) are to be input. For example, the send screen 107 includes as the soft keys a key K21 for allowing the display section 473 to display a document image that will be sent, keys K22 for selecting an address with a single touch, a key K23 for calling an address book, a key K24 for inputting any address not registered in the address book, and a key K25 for newly creating a shared folder not registered in the address book. When the user presses one of the plurality of soft keys described above, the control section 10 allows the display section 473 to display a screen, window or the like through which a setting associated with the selected key is to be made.

Although in the above embodiment the user can select only one function through the home screen 101, the number of functions selectable at a time in the present disclosure is not limited to one. In another embodiment, the user can select, through the home screen, at least one of the plurality of functions executable by the image forming apparatus 1. For example, the image forming apparatus may be configured so that the user can select two functions at a time by making inputs from two soft keys being displayed on the home screen.

Furthermore, although in the above embodiment the apparatus state transition program for implementing processing for wake-up from the power save mode is stored on the HDD 92, the storage medium for the apparatus state transition program in the present disclosure is not limited to the HDD. For example, the apparatus state transition program may be recorded on a computer-readable non-transitory recording medium (for example, a hard disk, a CD-ROM, a DVD- ROM or a semiconductor memory). The apparatus state transition program recorded on the non-transitory recording medium may be read by a reading device, such as an optical disk drive, and transferred to the HDD 92 or may be sent via a network to the image forming apparatus 1 and stored on the HDD 92. Alternatively, the apparatus state transition program may be directly loaded into the RAM of the control section 10 from the non-transitory recording medium or via the network.

The present disclosure is not limited to the above embodiments and can be modified in various ways. For example, although the description of the above embodiments is given taking a multicolor multifunction peripheral as an example of the image forming apparatus according to the present disclosure, the example is merely illustrative and the image forming apparatus may be, for example, a black-and-white multifunction peripheral or any other electronic apparatus, for example, any other image forming apparatus, such as a printer, a copier or a facsimile machine.

The structures, configurations, and processing shown in the above embodiments with reference to FIGS. 1 to 11 are merely illustrative of the present disclosure and not intended to limit the present disclosure to the above particular structures, configurations, and processing.

While the present disclosure has been described in detail with reference to the embodiments thereof, it would be apparent to those skilled in the art the various changes and modifications may be made therein within the scope defined by the appended claims.

What is claimed is:

1. An image forming apparatus capable of, upon satisfaction of a predetermined condition, waking up from a power saving state requiring less power, the image forming apparatus comprising:
    an image forming section that includes a photosensitive drum, a charging device, an exposure device, a developing device, and a transfer device, and forms an image on a recording paper sheet;
    an operating section that accepts user's instructions;
    an image reading section that reads an image from an original document and acquires image data;
    a first detecting section that is a motion sensor detecting a person present within a predetermined range from the image forming apparatus;
    a second detecting section that is an eye-gaze sensor detecting an eye gaze of the person detected by the first detecting section;
    a display section that includes a display; and
    a control unit including a processor and, when the processor executes a control program, being configured to act as a control section,
    wherein when, during the power saving state of the image forming apparatus, the first detecting section detects a person and the second detecting section detects the person's eye gaze is directed toward the operating section or directed toward the image reading section, the control section wakes up the image forming apparatus from the power saving state and allows the display section to display a home screen for use in selecting one of a plurality of functions executable by the image forming apparatus in case that the person's eye gaze detected by the second detecting section is directed toward the operating section, and allows the display section to display a copy screen for use in making settings for the copy function in case that the person's eye gaze detected by the second detecting section is directed toward the image reading section,
    the image forming apparatus further comprises a sheet output section that includes an output tray to which a recording paper sheet having an image formed thereon is to be discharged,
    wherein when, during the power saving state of the image forming apparatus, the first detecting section detects a person and the second detecting section detects an eye gaze of the person directed toward the sheet output section, the control section keeps a state of the image forming apparatus in the power saving state,
    the image forming apparatus further comprising a third detecting section that is an optical sensor detecting whether or not any recording paper sheet is present on the sheet output section,
    wherein when, during the power saving state of the image forming apparatus, the first detecting section detects a person, the second detecting section detects an eye gaze of the person directed toward the sheet output section, and the third detecting section detects absence of any recording paper sheet on the sheet output section, the control section wakes up the image forming apparatus from the power saving state and allows the display section to display a pop-up screen for use in checking a status of processing executed on the image forming apparatus.

2. The image forming apparatus according to claim 1, wherein when the control section determines that the first detecting section has detected a person, the control section supplies power to the second detecting section to activate the second detecting section.

3. The image forming apparatus according to claim 1, wherein the second detecting section is a contactless eye-gaze sensor including: a light source that irradiates a cornea of a user's eye with near-infrared rays; and a camera that captures movement of the eye on which corneal reflection is generated.

* * * * *